United States Patent [19]

O'Meara

[11] Patent Number: 4,642,582
[45] Date of Patent: Feb. 10, 1987

[54] NONLINEAR DELAY LINE ENCODING/DECODING ARRANGEMENTS

[75] Inventor: Thomas R. O'Meara, Malibu, Calif.

[73] Assignee: Hughes Aircraft Company, Los Angeles, Calif.

[21] Appl. No.: 836,201

[22] Filed: Feb. 26, 1986

Related U.S. Application Data

[63] Continuation of Ser. No. 278,536, Jun. 29, 1981, abandoned.

[51] Int. Cl.[4] ............................................. H01S 3/30
[52] U.S. Cl. ................................. 332/7.51; 307/425; 455/611
[58] Field of Search ............... 307/425, 429; 455/611; 332/7.51; 330/4, 3; 372/21, 26

[56] References Cited

U.S. PATENT DOCUMENTS

| | | | |
|---|---|---|---|
| 4,145,671 | 3/1979 | Hellworth | 332/7.51 |
| 4,209,690 | 6/1980 | Rentrepis | 332/7.51 |
| 4,220,928 | 9/1980 | Bloom et al. | 332/7.51 |
| 4,321,550 | 3/1982 | Eutuhev | 307/425 |

OTHER PUBLICATIONS

O'Meara et al., "Time-Domain Signal ... Delay Lines", 4/82, pp. 237-242, Opt. Eng. vol. 21(2).
Fekita et al., "Phase-conjugate ... in the Isotropic Phase", 2/80, pp. 51-53, Opt. Letters, vol. 5, #2.

Primary Examiner—Nelson Moskowitz
Attorney, Agent, or Firm—V. D. Duraiswamy; K. W. Float; A. W. Karambelas

[57] ABSTRACT

Apparatus for encoding and decoding laser pulses, or the like. At least one laser source applied laser energy to a nonlinear material in a manner such that counter-propagating beams are applied to the material. These laser beams are spatially or temporally modulated in a predetermined manner. The modulation may be continuous, or discrete, amplitude or phase modulation. Another laser source provides a probe pulse which traverses the nonlinear material and interacts with the counter-propagating laser beams in a manner known as four-wave mixing. This process generates an encoded laser pulse whose modulation pattern is a function of the modulation of the counter-propagating beams. A decoded laser pulse is obtained by applying the encoded pulse to the apparatus and reversing the modulation of the counter-propagating laser beams.

8 Claims, 10 Drawing Figures

NONLINEAR DELAY LINE ENCODING/DECODING ARRANGEMENTS

This application is a continuation of application Ser. No. 278,536, filed June 29, 1981, now abandoned.

BACKGROUND OF THE INVENTION

The present invention relates generally to optical encoding and decoding arranegements, and more particularly, to optical encoding and decoding arrangements which employ phase conjugation principles and four-wave mixing in particular.

Pulse encoding and decoding systems are commonly known in the electronics, microwave and optical arts. Such systems may be employed in radars, communications equipment which require pulse compression or cryptographic encoding of signals, or other similar systems. Although pulse encoding and decoding systems are well-known in the electronics and microwave arts, applications of these techniques for use in the optical frequency range has been quite difficult, typically due to the requirements of high precision in the optical components.

For instance, the tapped delay line matched filter, which is well-known in the microwave art, has been proposed for use in optical encoding/decoding applications. However, in order to achieve a useful matched filter, outputs from each segment of the filter must add coherently, and thus the segments must be well-controlled in path length to a precision of λ/10 or better at the the optical wavelength of interest. In addition, drifts in the effective path lengths induced by temperature or aging effects seriously degrades the use of this device at optical frequencies.

Thus, it would be an improvement in the optical filtering and signal processing arts to provide an optical encoding/decoding system for use at optical frequencies which does not require high-precision tolerances in the optical components as do prior art systems.

SUMMARY OF THE INVENTION

In order to overcome the problems existing in the prior art, the present invention provides for an encoding/decoding system which may be utilized to encode and decode laser pulses. As is typical in delay line matched filters, the basic system may be utilized both for encoding and decoding. However, in the encoding process, an unencoded laser pulse is applied to the system, whereas in the decoding process, the encoded laser pulse is applied to a complementary system of similar structure.

In particular, the optical encoding system incorporates an optical delay line comprising a nonlinear material (nonlinear medium) which is capable of producing a four-wave mixing signal. A source of laser signal pulses is provided which applies pulses to the nonlinear medium in a manner such that the pulse traverses the length of the medium. One or more additional laser sources are provided which apply laser light having a predetermined modulation across the nonlinear medium. The predetermined modulation may be either spatial or temporal. These sources apply four-wave mixing pump beams that are counter-propagating in the medium.

As the laser signal pulse traverses the length of the medium, it interacts with the modulated laser pumps to produce four-wave mixing in the medium. The four-wave mixing process generates an elongated and encoded backscattered laser pulse whose encoded pattern is modulated in accordance with the predetermined modulation patterns in the pump beams. As in the prior art of delay line filters, quite general output functions may be generated whose shapes are described by correlations or convolutions of the input waveform with the impulse response of the filter delay line.

In the present invention, the corresponding decoding system which decodes a laser pulse having the above-mentioned encoded pattern comprises the same nonlinear medium and laser source for applying the modulated laser light to the nonlinear medium. The encoded pulse is applied to the nonlinear medium so that it traverses the length thereof. The pump beams are applied to the nonlinear medium such that the modulation is reversed, either spatially or temporally. The encoded laser pulse thus traverses the length of the medium and interacts with the modulated light in a manner which produces four-wave mixing in the medium.

Alternatively, the encoded pulse may traverse the nonlinear medium in a direction opposite to the direction of the unencoded pulse, with the pump beams having the identical modulation patterns as in the encoding process. The four-wave mixing process generates the backscattered laser pulse which is decoded. This decoded pulse is a correlation of the predetermined modulation and the encoded modulation.

One useful decoding configuration provided by the present invention is a matched filter whose impulse response is the time reversal of the input waveform. If employed for pulse compression the present invention typically provides an effective central lobe of the decoded correlation pulse which is substantially shorter than the input pulse.

This system eliminates the requirements for high-precision optical fabrication in the delay paths of the optical delay line. In addition, since temperature and aging effects in the delay line do not affect this system design, an improvement in the achievable time-bandwidth product for optical systems incorporating the present system is provided.

BRIEF DESCRIPTION OF THE DRAWINGS

The foregoing features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
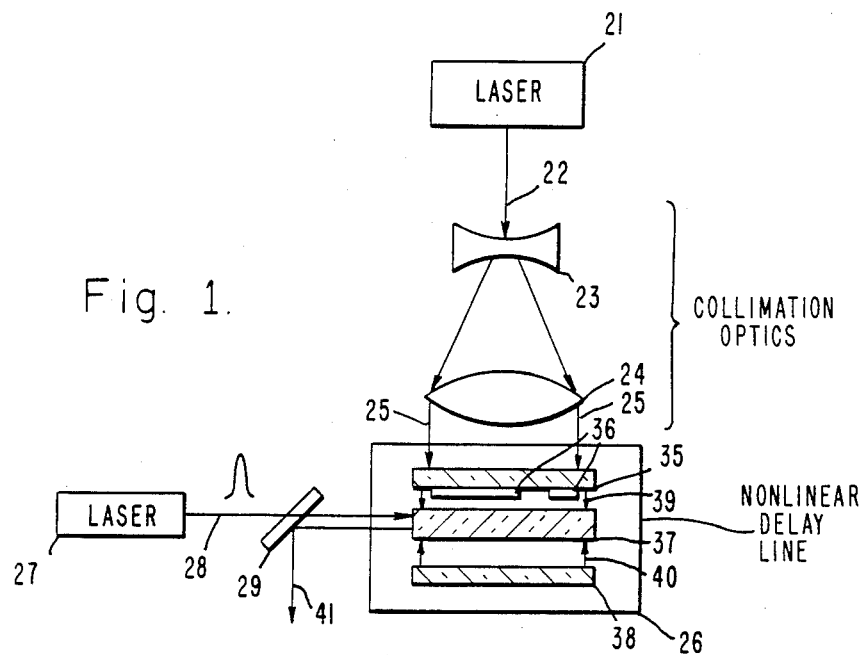
FIG. 1 is a nonlinear delay line optical encoding system in accordance with the present invention.

Referring to FIG. 1, there is shown one embodiment of an encoding system in accordance with the present invention. The embodiment of FIG. 1 incorporates the principles of discrete-step phase encoding of the laser energy. However, the principles of the present invention are not limited to discrete encoding, but also encompass the use of continuous phase encoding, or continuous or discrete amplitude encoding, or the like. In addition, both spatial and temporal modulation may be employed in the present system. The embodiment of FIG. 1 is presented to develop the underlying principles of the present invention which will be expanded upon later on in the description.

The embodiment of FIG. 1 comprises a laser source 21 whose output beam 22 is enlarged and collimated by optics 23, 24 to provide an enlarged collimated output beam 25. Optics 23 and 24 can comprise apparatus known in the art such as, but not limited to, a concave lens 23 and a convex lens 24 as illustrated in FIG. 1. Concave lens 23 causes output beam 22 to expand or diverge and convex lens 24 refocuses the beam into collimated beam 25 having an approximately circular or elliptical cross-section, dependent on the shape of plate 35. Alternatively optics 23 and 24 could be replaced by a series reflective prisms. The collimated output beam 25 is applied to a nonlinear delay line 26 which comprises an optical flat 35 onto which is deposited a thin film coating 36. The thin film coating 36 is utilized to provide the discrete step phase encoding of the collimated laser beam 25. The discrete step phase encoded beam is identified by arrows 39.

The phase encoded beam 39 is then applied to a nonlinear medium 37. The nonlinear medium 37 may be a solid, liquid or gaseous material, such as carbon disulfide, or fused quartz optical fibers, or the like. The nonlinear medium 37 must be able to undergo the phase conjugation process known as four-wave mixing, a process which will be more fully described hereinbelow. Each specific laser source 21 has a number of nonlinear media 37 for which the four-wave mixing process may occur. Table 1 hereinbelow provides a list of such lasers and corresponding nonlinear media for which four-wave mixing has has been demonstrated.

TABLE 1

| WAVE-LENGTH | LASER | PULSED OR CW | NONLINEAR MEDIUM |
|---|---|---|---|
| 10 μm | $CO_2$ | PULSED | $SF_6$ |
| | | | HgCdTe |
| | | | $CO_2$ (INVERTED) |
| | | | Ge |
| | | | $NH_3$ |
| | | | $KCl:R_cO_4$ |
| 3.8 μm | DF | PULSED | Ge |
| 1.06 μm | Nd:YAG | PULSED | Si |
| | | | Nd:YAG |
| | | | BDN (IR DYE) |
| 0.69 μm | RUBY | PULSED | |
| | | | CRYPTOCYANINE |
| | | | CdS CdSe GLASS |
| | | | $CS_2$ |
| 5890Å | DYE | CW | Na |
| | | PULSED | Na |
| 5320Å | DOUBLED Nd:YAG | PULSED | CdS, CdSe GLASSES IODINE VAPOR |

TABLE 1-continued

| WAVE-LENGTH | LASER | PULSED OR CW | NONLINEAR MEDIUM |
|---|---|---|---|
| | | | RHODAMINE 6G |
| | | | RHODAMINE B |
| 5100Å | DYE | PULSED | CdS, CdSe GLASS |
| 4880Å, | Ar+ | CW | RUBY |
| 5145Å | | | BSO |
| | | | $BaTiO_3$ |
| | | | LIQUID CRYSTALS |

The encoded laser beam 39 travels through the nonlinear medium 37 and is reflected from a mirror 38 to provide a counter-propagating laser beam 40. This laser beam 40 impinges upon the nonlinear medium 37 from a direction substantially opposite to that of the encoded laser beam 39. The thin film coating 36 of this embodiment is designed to be the thickness of ¼ wavelength of the particular laser optical wavelength at which the laser source 21 is operating. Therefore, the interaction between the counter-propagating laser beams 39, 40 in the nonlinear medium 37 produces a phase encoding scheme in which the phase contribution to the backscattered light by the counter-propagating beams 39, 40 is in phase at positions in the nonlinear medium 37 where the thin film coating is present, and encoding which is 180° out of phase in the position where the thin film coating 36 is not present.

A second laser source 27 applies a laser pulse 28 to one end of the nonlinear medium 37. The laser pulse 28 is applied through a beam splitter 29 which is utilized to extract an output pulse 41 from the nonlinear delay line 26. The laser pulse 28 is generally referred to as a probe pulse in the four-wave mixing art, and hereinafter it will be referred to as probe pulse 28.

Figure 2:
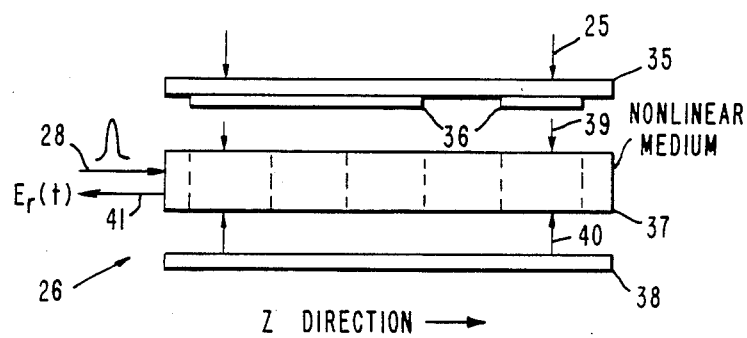
FIG. 2 is an enlarged view of the delay line mechanism of the encoder of FIG. 1.
Figure 3:
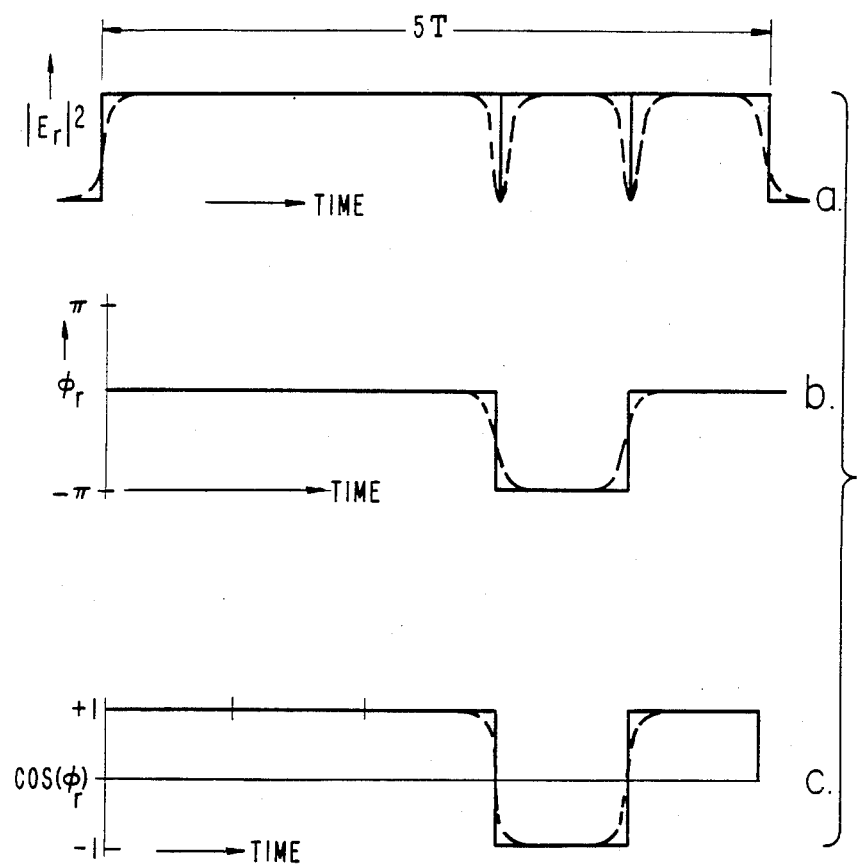
FIG. 3 shows various waveforms associated with the encoded pulse generated by the system of FIG. 1 utilizing a short pulse input signal.

The operation of the embodiment of FIG. 1 may be more easily understood with reference to FIGS. 2 and 3. FIG. 2 shows an enlarged view of the nonlinear delay line 26. In FIG. 2 the counter-propagating laser beams 39, 40 impinge upon the nonlinear medium 37 from substantially opposite directions. These counter-propagating beams are commonly referred to as pump beams with respect to the four-wave mixing process. Because of the thin film coating 36 the counter-propagating beams 39, 40 are phase encoded along the length of the nonlinear medium 37. Although the nonlinear medium is a continuous medium, it may be conceptually decomposed into discrete equal segments, or cells, shown by the dashed lines in FIG. 2. These cells correspond to the length of the corresponding portions of the thin film coating 36 which may be divided up into five equal length segments. The particular phase encoding scheme shown in FIGS. 1 and 2 corresponds to a Barker code of five.

The output pulse 28 from the second laser source 27, identified now as probe pulse 28, is applied to the end of the nonlinear medium 37. As the probe pulse 28 traverses the nonlinear medium 37, the interaction between the probe pulse 28 and the counter-propagating pump beams 39, 40, in each cell produces a reflected phase conjugated output pulse 41 designated as $E_r(t)$. The amplitude and phase of this output pulse 41 is shown in FIGS. 3a and 3b, respectively.

FIG. 3a shows the amplitude-time history of the output pulse 41 for two situations. The solid line shows the output pulse for a very short, or delta function, impulse input, while the dashed line indicates the output pulse 41 for a probe pulse 28 of finite width. The output pulse 41 is expanded in length to be 5 times the length of the nonlinear medium 37. The dips in the graph of FIG. 3a where the amplitude goes to zero are related to the nature of the scattering process in the nonlinear medium. This type of amplitude-time history is well-known to those in the matched filter art. The phase encoding of the output pulse 41 is shown in FIG. 3b, which shows a 180° phase shift of the optical carrier corresponding to that area of the nonlinear medium 37 where the interaction involved the out-of-phase counter-propagating pump beams 39, 40 (in the 4th cell from the left). FIG. 3c shows the normalized envelope modulation function of the encoded output pulse 41, commonly known in the encoding art as the classical n=5 Barker code.

The phase conjugation processes, and four-wave mixing in particular, may be more readily understood with reference to the following publications: "Phase Conjugate Optics and Real Time Holography" by Amnon Yariv, IEEE Journal of Quantum Electronics, Vol. QE-14, No. 9, September 1978; "Continuous Backward Wave Generation by Degenerate Four-wave Mixing In Optical Fibers" by John Au Yeung et al, Optics Letters, Vol. 14, No. 1, January 1979; "Spatial Convolution and Correlation of Optical Fields Via Degenerate Four-wave Mixing" by David M. Pepper et al, Optics Letters, Vol. 3, No. 1, July 1978; "Conjugate Wavefront Generation and Image Reconstruction by Four-wave Mixing" by D. M. Bloom et al, Applied Physics Letters, Vol. 31, No. 9, 1 November 1977; and "Amplified Reflection, Phase Conjugation and Oscillation in Degenerate Four-wave Mixing" by Amnon Yariv et al, Optics Letters, Vol. 1, No. 1, July 1977. The process of four-wave mixing is generally well-known in the phase conjugation art and will not be fully described herein. However, suffice it to say that the four-wave mixing process usually involves the generation of diffraction gratings at positions in the nonlinear medium 37 where the pump beams 39, 40 and the probe pulse 28 are simultaneously present. Since the pump beams are reflected from these diffraction gratings to generate the conjugated pulse 41, the phase encoding of the counter-propagating pump beams 39, 40 is transferred onto the conjugated pulse 41.

The probe pulse 28 which is to be encoded, is chosen to be of sufficiently short duration that its spatial extent in the nonlinear medium 37 is reasonably short compared with the width of a modulation cell. As the probe pulse 28 traverses each modulation cell, the four-wave mixing process generates a portion of the backscattered phase conjugated pulse 41. Based on the conventional theory of four-wave mixing, the phase of the backscattered wavefront at any point z is given by the equation $$\phi_r(z) = -\phi_i(z) + 2\phi_p(z)$$

where $\phi_i(z)$ is the propagation phase delay from any reference point, such that $$\phi_i = 2\pi z/\lambda.$$

The z direction is shown in FIG. 2. The backscattered pulse 41 encounters a second phase delay on the backward path as it propagates back to the reference plane, which is $$\phi_b = 2\pi z/\lambda = \phi_i$$

Therefore, the net phase of the backscattered wave at the reference plane is given by $$\phi(0) = 2\phi_p(z),$$

and is solely determined by the pump encoding.

Consequently, the pulse-to-pulse phase coherence of the encoded pulse 41 is independent of length changes in the nonlinear medium 37. This is contrasted to all other known delay encoding systems whose performance is critically dependent on changes in lengths of the encoding cells. In addition, the width and center-to-center spacing of the optical flat 35 and mirror 38 need only be held to a reasonable fraction of a cell width, as contrasted to the suboptical wavelength tolerances required in a conventional optical delay line system.

Figure 4:
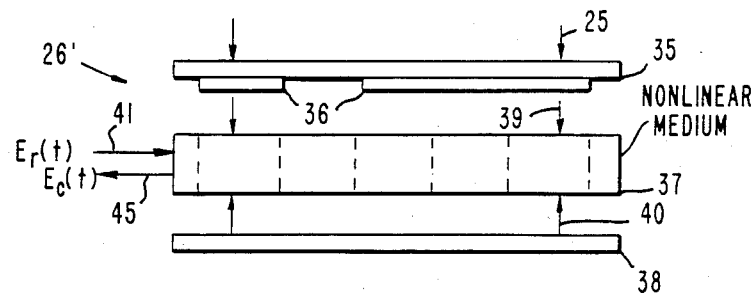
FIG. 4 shows a decoder arrangement in accordance with the present invention.

Referring now to FIG. 4, there is shown a decoder in accordance with the present invention. The embodiment of FIG. 4 amounts to a matched filter, as it is commonly known in the art, since it is designed to decode the specific encoding scheme provided by the encoding embodiment of FIG. 1. FIG. 4 is substantially identical to the nonlinear delay line 26 shown in FIG. 2. However, the applied input pulse, which in this instance is the encoded pulse 41, is applied to the opposite end of the nonlinear medium 37. It is to be noted that the embodiment of FIG. 4 is physically reversed with respect to the embodiment of FIG. 2. Alternatively, the modulation of the pump beams may be spatially reversed and the encoded pulse 41 applied to the same end as the unencoded input pulse.

Figure 5:
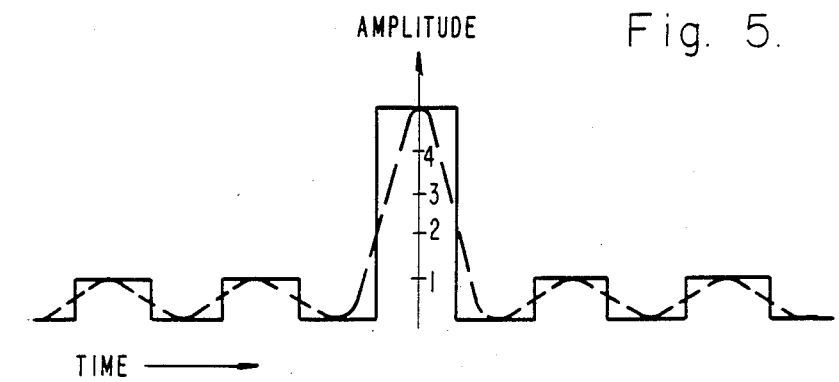
FIG. 5 shows the amplitude time waveform of the decoded pulse provided by the decoder of FIG. 4.

The description and operation of the decoder is substantially the same as the encoding process described hereinabove. In the decoding process, the four-wave mixing process generated by the interaction between the pump beams 39, 40 and the applied encoded pulse 41 generates a phase-conjugated reflected pulse 45 as shown in FIG. 5. The shape of the decoded pulse 45 shown in FIG. 5 is generated from a superposition of all the reflected waves generated in the entire nonlinear medium 37.

Figure 6:
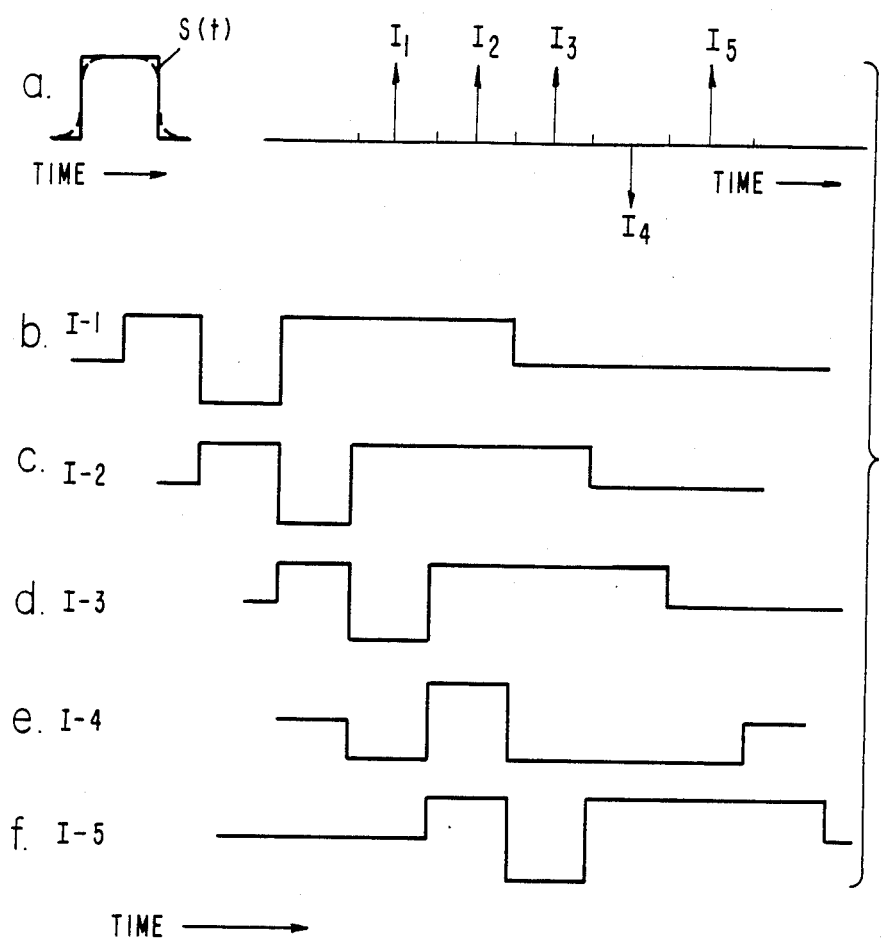
FIG. 6 shows waveforms which are pertinent to illustrate how the waveform of FIG. 5 is generated.

This process may be more easily understood with reference to FIG. 6. The decoding, or pulse compression, operation of the matched filter of FIG. 4 may be most easily understood by convolutionally decomposing the normalized envelope modulation function shown in FIG. 3c into an impulse sequence I(t) and a shape function S(t). This decomposition is shown in FIG. 6a. The sign of the impulse fuction in FIG. 6a denotes exp $i2\phi_p$, where $2\phi_p$ is either 0 or $2\pi$ as indicated in FIG. 3c. Each impulse function I-1 through I-5 may be applied to the nonlinear delay line of FIG. 4 in the same manner as was originally discussed with reference to FIG. 3a. Accordingly, each particular impulse function generates its own reflected waveform with its own amplitude and phase time history, as shown in FIGS. 3a and 3b.

The reflected waveforms for impulse functions I-1, I-2, I-3 and I-5 are identical except that they are spatially shifted by the number of cell widths separating the various impulse functions. The bottom five graphs shown in FIGS. 6b-6f represent the output pulse associated with each input pulse as it is reflected from the nonlinear delay line shown in FIG. 4. As may be seen from FIG. 6, the graphs of FIG. 6b, c, d and e are identical except they are shifted the appropriate cell width with respect to each other. FIG. 6e, however, has an inverted output response which corresponds to the particular phase of the fourth impulse function I-4. A vertical superposition, or addition, of the amplitudes of FIGS. 6b through 6f generates the output pulse 45 shown in FIG. 5. The square-wave pulse of FIG. 5 is the convolution of the impulse functions and an ideal squarewave. However, for a typical shape function having rounded corners as shown in the dashed curve S(t) of FIG. 6b, the corresponding output pulse 45 is as shown by the dashed curve of FIG. 5. This dashed curve corresponds to the classical auto-correlation function of the Barker code of five.

Similarly, many other types of encoded waveforms and matched filters may be realized by the present invention. For example, a book entitled "Radar Signals", by Charles E. Cook et al, Academic Press, 1967, presents a discussion of binary phase codes, and Barker codes in particular, in Section 8.3 of this book. In addition, Section 8.6 discusses the concept of matched filters for discrete coded signals.

Figure 7A:
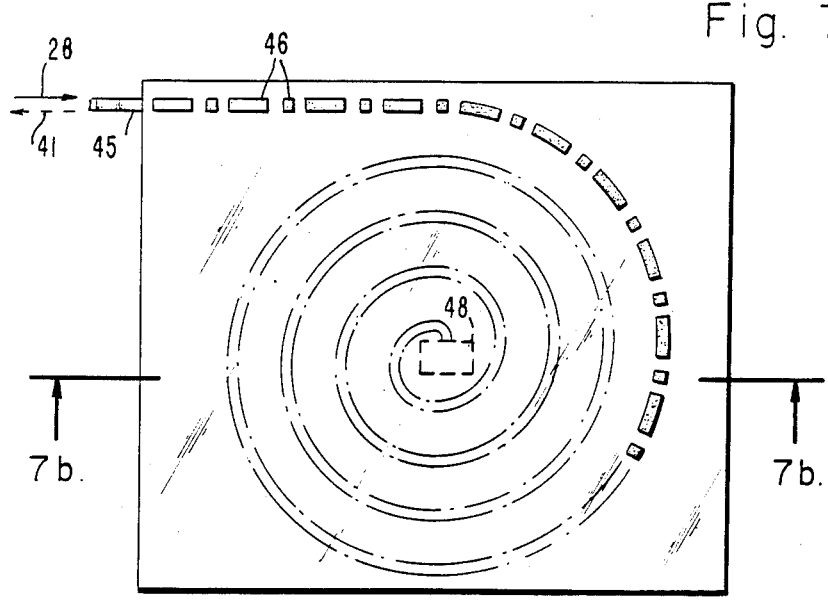
FIG. 7a and b show a second embodiment of a delay line mechanism for use with the present invention.
Figure 7B:
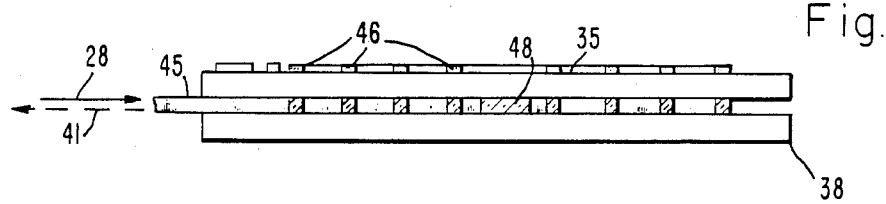

Referring to FIG. 7, there is shown a second embodiment of the nonlinear delay line 26 of the present invention. This embodiment includes an optical flat 44 onto which is deposited or etched an encoding strip 46. This strip comprised a plurality of phase encoding strips corresponding to the phase encoding scheme described with reference to FIG. 2. Directly below the phase encoding strip 46 is a square optical waveguide 45 into which is applied the probe pulse 28. The waveguide 45 terminates at an absorber 48, comprised of gold black, anodized aluminum, or index matching fluid such as glycerin, fiberglass, or the like, for use with a $CO_2$ laser source, disposed at the center of the waveguide spiral. Each particular laser source has a variety of absorbers which may be used therewith, at the discretion of the user. The collimated laser light 25 is applied across the waveguide through the optical flat 44 and is reflected from a mirror 47 similar to the manner as described with reference to FIG. 2. This particular encoding device provides for added benefits which include the ability to generate and process or filter much longer codes than may be processed in a simple slab device shown in FIG. 1.

Figure 8:
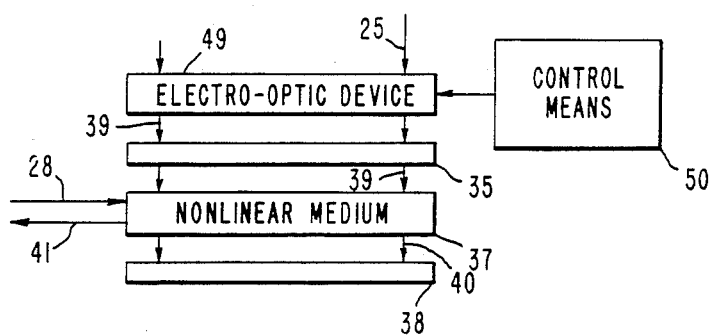
FIG. 8 shows a third embodiment of a delay line mechanism for use with the present invention.

Referring to FIG. 8 there is shown a third embodiment of a nonlinear delay line arrangement for use with the present invention. This particular embodiment is substantially identical to that of FIG. 2. However, the discrete-step phase encoding scheme of FIG. 2, utilizing the thin film coating technique, has been replaced by an electro-optic crystal 49 and the associated control means 50 therefor. The electro-optic crystal 49 may be electronically programmed to allow for either amplitude or phase encoding of the collimated laser beam 25. The use of electro-optic crystals in this manner is well-known in the art and details describing this operation will not be given herein. However, reference is made to the book entitled "Quantum Electronics", by Amnon Yariv, John Wiley and Sons, Chapter 14, which describes the use of electro-optic crystals for electronically induced phase shifting.

Figure 9:
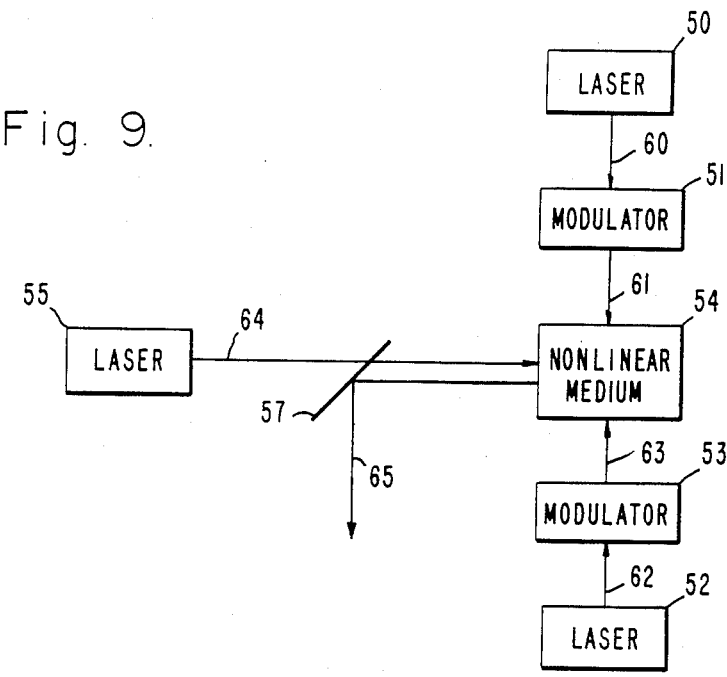
FIG. 9 shows a fourth embodiment of a nonlinear delay line system in accordance with the present invention.

Referring to FIG. 9, a fourth embodiment of the present invention is provided which is useful in illustrating a variety of further encoding and decoding systems made possible by the present invention. A first laser source 50 applies a beam 60 through a first modulator 51 to a nonlinear medium 54. Also, a second laser source 52 applies its beam 62 through a second modulator 53 to the nonlinear medium 54. The light provided by each of the laser sources 50, 52 is at substantially the same frequency. The modulators 51, 53 may encode the beams 60, 62 in a variety of ways to provide numerous encoding or decoding system.

For example, by spatially encoding the beams 60, 62 to apply spatially modulated pump beams 61, 63 to the nonlinear medium 54, and applying a temporally encoded laser probe pulse 64 provided by laser source 55 to the nonlinear medium 54, an output pulse 65 results whose temporal character is a convolution or correlation of the spatially modulated beams 61, 63. If, for example, one of these waveforms is a reference or filter waveform and the second is a signal, then the present invention constitutes a matched filter for the signal which functions to produce a compressed output pulse as shown in the waveform of FIG. 5. This would be accomplished by providing the modulation encoding of FIG. 3 to beam 61, and a time-reversed modulation encoding, as in FIG. 3 to beam 63.

Also, if the pump beams 61, 63 have been temporally modulated, and an unencoded probe pulse 64 is applied to the nonlinear medium 54, then an encoded output pulse 65 is provided which is the cross-correlation of the two temporally modulated pump beams 61, 63. In order for this cross-correlation to occur, one pump beam 61 must have temporally reversed modulation applied to it with respect to the other pump beam 63. In the cross-correlation embodiment, it is necessary to synchronize the timing of the pump beams 61, 63 and the probe pulse 64 so that they propagate through the medium 54 at the same time, in order to get the desired cross-correlation function.

Thus, there has been described new and useful optical filtering arrangements which provide for the encoding/decoding of laser pulses, or the like. The pulse-to-pulse phase coherence of the encoded pulses provided by the present invention is independent of length changes in the nonlinear medium. In addition, the tolerances associated with the optical elements utilized in the present invention are not as critical as those for conventional systems. The present invention is generally unaffected by temperature and aging affects, which sets the time-bandwidth product of a delay line filter. Hence, the present invention provides for optical delay line devices which have improved time-bandwidth performance.

It is to be understood that the above-described embodiments are merely illustrative of some of the many specific embodiments which represent applications of the principles of the present invention. Clearly, numerous and varied other arrangements may be readily devised by those skilled in the art without departing from the spirit and scope of the invention.

What is claimed is:

1. An encoding system for encoding and coherently modulating laser pulses, said system comprising:
    a nonlinear medium having a predetermined length and cross-section and being capable of undergoing four-wave mixing;
    first laser means for applying laser pulses to said nonlinear medium such that said pulses traverse the length thereof;
    second laser means for applying light such that said light impinges upon said medium from two predetermined directions to provide pump beams for said four-wave mixing; and
    means for phase-encoding said light from said second laser means such that it has a predetermined spatial modulation thus providing spatially modulated laser light;

whereby said applied laser pulses traverse the length of said medium and interact with said spatially modulated laser light in a manner which produces said four-wave mixing in said medium, said four-wave mixing generating elongated encoded laser pulses which are temporally modulated in accordance with said predetermined spatial modulation.

2. A decoding system for decoding an applied laser pulse temporally modulated in accordance with a predetermined spatial modulation, said arrangement comprising:

a nonlinear medium having a predetermined length and cross-section and being capable of undergoing four-wave mixing;

means for applying said encoded pulse to said nonlinear medium such that said pulse traverses the length thereof;

laser means for applying laser light across said nonlinear medium such that said light impinges upon said medium from two predetermined directions to provide pump beams for said four-wave mixing;

means for modulating said laser light such that it has a spatial modulation which is spatially-reversed with respect to said predetermined spatial modulation employed to encode said applied laser pulse; and whereby said applied laser pulse traverses the length of said medium and intereacts with said spatially modulated laser light in a manner which produces said four-wave mixing in said medium, said four-wave mixing generating a decoded laser pulse which is the convolution of said predetermined spatial modulation of said modulated laser light and said encoded temporal modulation of said applied laser pulse.

3. The system of claim 2, wherein said means for modulating said laser light comprises:

an optical element having an optical coating deposited thereon which has a predetermined spatial pattern, and an optical reflector, disposed on opposite sides of said nonlinear medium for modulating said laser light applied to said nonlinear medium.

4. The system of claim 2 wherein said means for modulating said laser light comprises:

an electro-optic device and electronic control means therefor for modulating said laser light applied to said nonlinear medium.

5. The system of claim 1 wherein said means for phase-encoding said light from said second laser means comprises:

an optical element having an optical coating deposited thereon which has a predetermined spatial pattern, and an optical reflector, disposed on opposite sides of said nonlinear medium for modulating said laser light applied to said nonlinear medium.

6. The system of claim 1 wherein said means for phase-encoding said light from said second laser means comprises:

an electro-optic device and electronic control means therefor for modulating said laser light applied to said nonlinear medium.

7. The system of claim 2 wherein said laser means comprises:

a plurality of laser sources providing light at substantially the same frequency; and a plurality of modulators individually coupled to said pluraltiy of laser sources for modulating laser light provided thereby.

8. The system of claim 1 wherein said second laser means comprises:

a plurality of laser sources providing light at substantially the same frequency; and a plurality of modulators individually coupled to said plurality of laser sources for modulating laser light provided thereby.

* * * * *